Aug. 18, 1964 W. G. WHITNEY ETAL 3,145,268

MULTI-TRACK RECORD-REPRODUCE SYSTEM WITH SERVO CONTROLLED TRACK SELECTOR

Filed Nov. 13, 1961 5 Sheets-Sheet 1

INVENTORS
WILLIAM G. WHITNEY
BRUCE N. WHITLOCK
BY George H. Fritzinger
AGENT

INVENTORS
WILLIAM G. WHITNEY
BRUCE N. WHITLOCK
BY George H. Fritzinger
AGENT

INVENTORS
WILLIAM G. WHITNEY
BRUCE N. WHITLOCK
BY George H. Fritzinger
AGENT

INVENTORS
WILLIAM G. WHITNEY
BRUCE N. WHITLOCK
BY George H. Fritzinger
AGENT

INVENTORS
WILLIAM G. WHITNEY
BRUCE N. WHITLOCK
BY George H. Fritzinger
AGENT 3,145,268
MULTI-TRACK RECORD-REPRODUCE SYSTEM WITH SERVO CONTROLLED TRACK SELECTOR
William G. Whitney, Pines Lake, Wayne, and Bruce N. Whitlock, Orange, N.J., assignors to McGraw-Edison Company, Elgin, Ill., a corporation of Delaware
Filed Nov. 13, 1961, Ser. No. 151,666
9 Claims. (Cl. 179—100.2)

This invention relates to an apparatus for recording and reproducing characters or discrete bits of information on respective tracks of a multi-track record medium with the use of a single record-reproduce head, and particularly the invention relates to a servo controlled system for bringing any selected track instantly and precisely into registration with the head.

This invention represents an improvement in the educational apparatus for children described and claimed in the pending application of Omar K. Moore and Richard Kobler, S.N. 113,420, filed May 29, 1961, now Patent No. 3,112,569, dated December 3, 1963, and is herein described in connection with such apparatus without intending however any unnecessary limitation of the invention thereto. Such educational apparatus operates to pronounce automatically the selected character whenever the respective key of the keyboard of a typewriter is depressed. This is done by means of a reproducing apparatus having each character represented on the keyboard prerecorded on respective tracks of the record medium and by a control apparatus responsive to the depressing of each key of the keyboard to reproduce the respective track of the record to pronounce the selected character. By the present invention an improved selector system is provided which brings the head and correct track quickly into registration and thereupon starts the reproducing machine responsive to each key depression.

An object of the invention is to provide a servo-controlled selector system for bringing any of a plurality of tracks on a record medium into registration with a record-reproduce head of a phonographic mechanism.

Another object is to provide such selector system which operates well-nigh instantaneously and with high precision.

Another object is to provide a record-reproduce system for characters or other information which is left in a ready state for a succeeding character selection following each recording or reproducing of a previously selected character.

Another object is to provide a record medium for recording characters thereon and reproducing the same therefrom, which has a multiplicity of parallel tracks wherein a pair of side-by-side tracks is provided for each character and the character is recorded in one direction on a first track of each pair and in the opposite direction on the second track thereof.

Another object is to provide a selector system which operates responsive to a character selection to bring the head into registration with the first or second track of the respective pair depending upon which end of travel the head occupies when the character selection is made.

Other objects are to provide a character selector system and a record-reproduce machine of the transversal type, which are of a simplified electrical mechanical design and of improved operation.

These and other objects and features of the invention will be apparent from the following description and the appended claims.

In the description of the invention reference is had to the accompanying drawings, of which:

Figure 5:
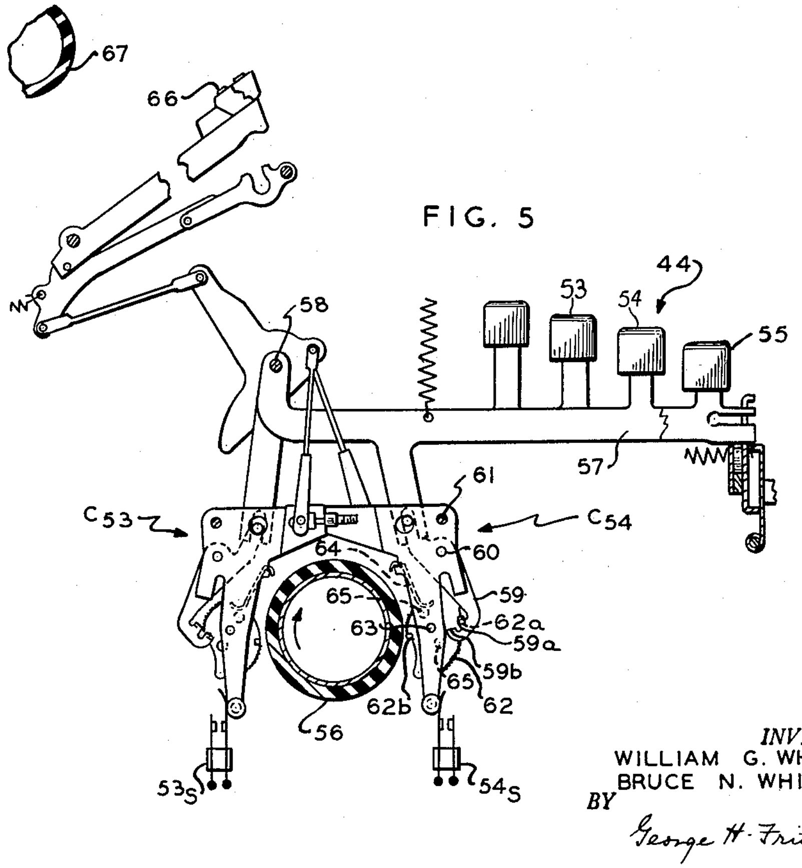
Figure 6:
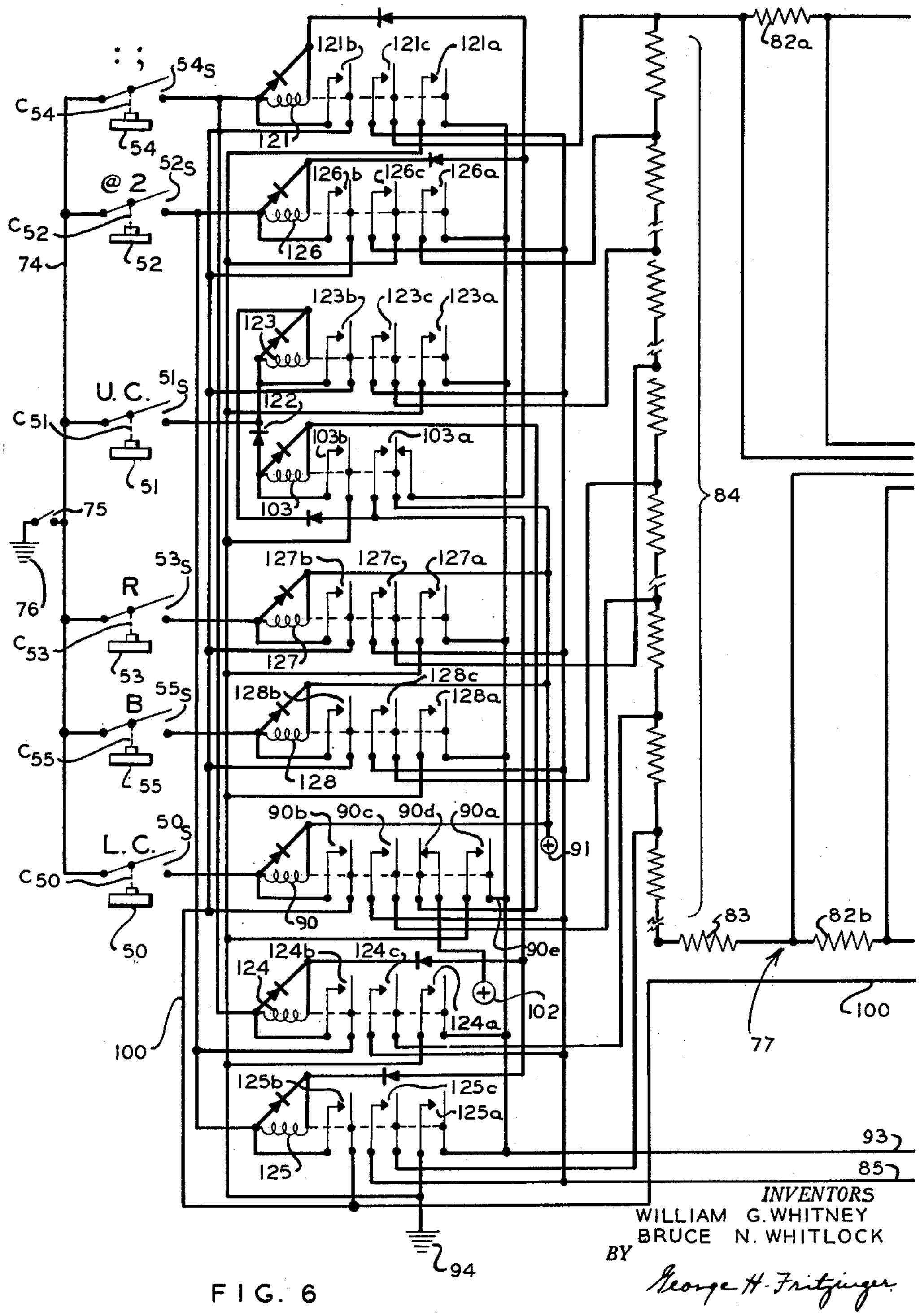
Figure 6A:
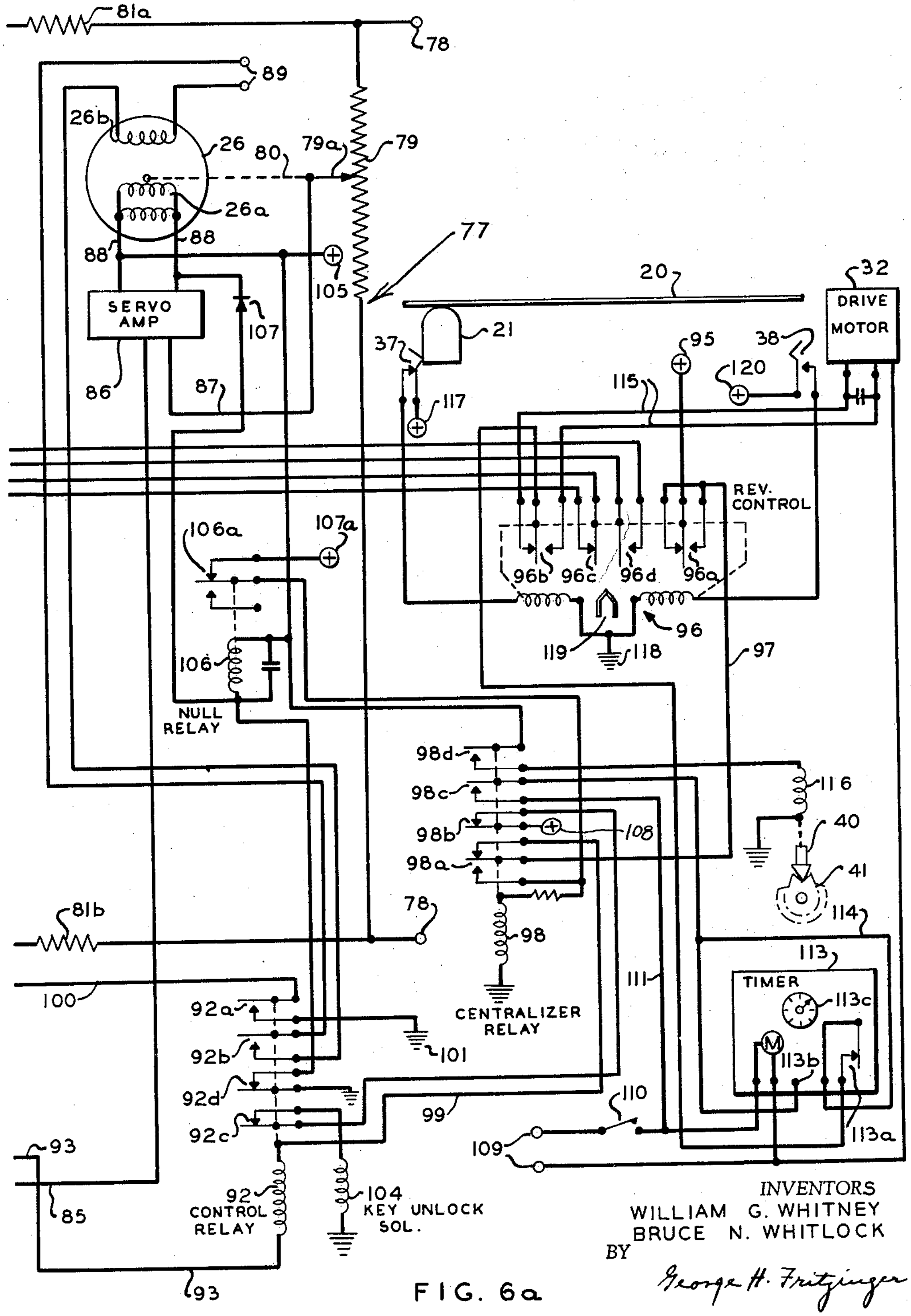

FIGURE 5 is a fractional elevational view of a power roll and associated front and back cam units operable thereby responsive to pressing respective keys of the typewriter mechanism; and FIGURES 6 and *6a* together constitute a schematic circuit diagram of a selector system according to the invention for selectively placing the tracks of the record medium into register with the record-reproduce head responsive to pressing the respective keys of the keyboard of the typewriter mechanism.

Figure 1:
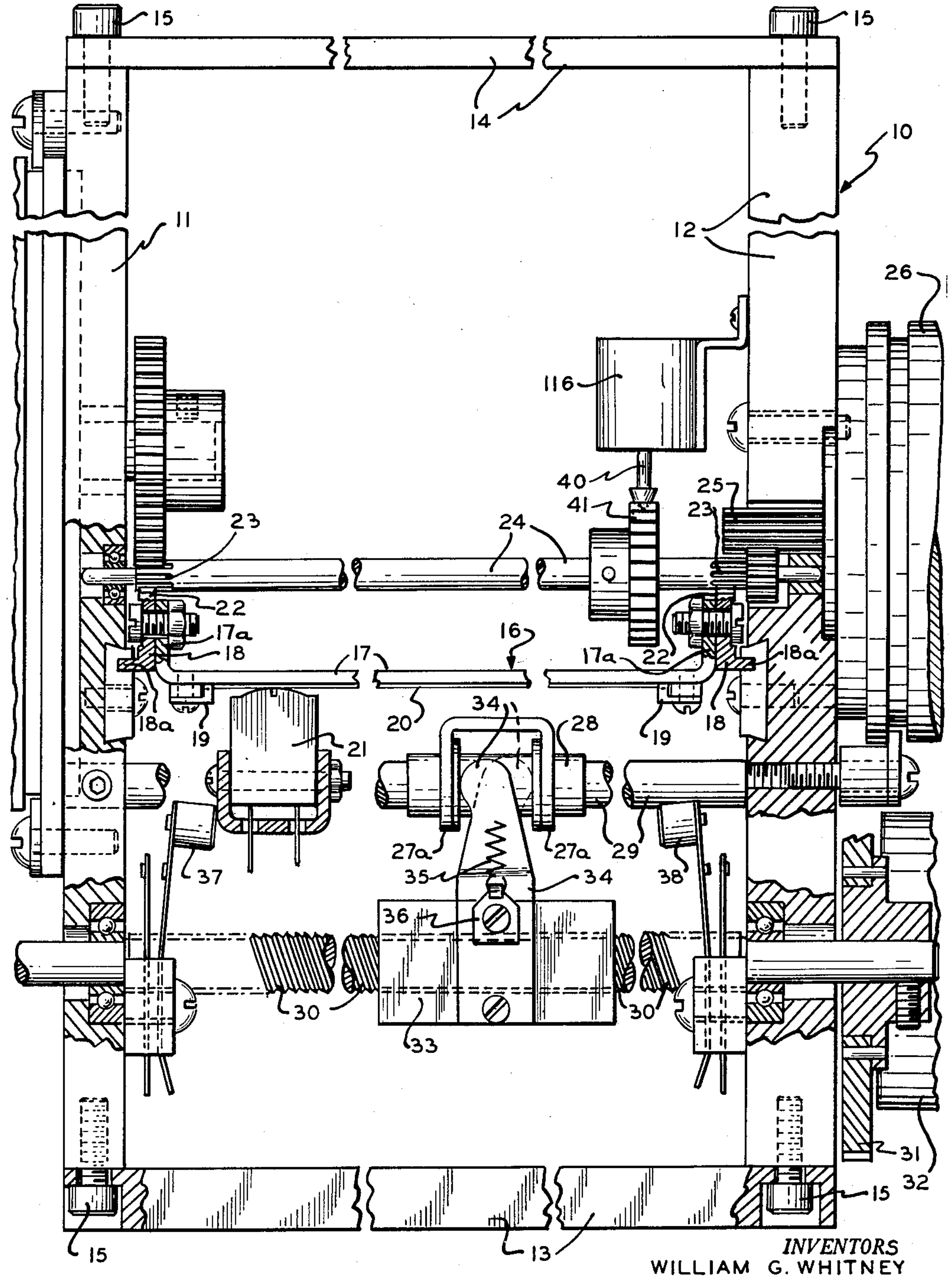
FIGURE 1 is a front elevational view with portions broken away of a transversal type record-reproduce machine according to the invention.
Figures 2, 3:
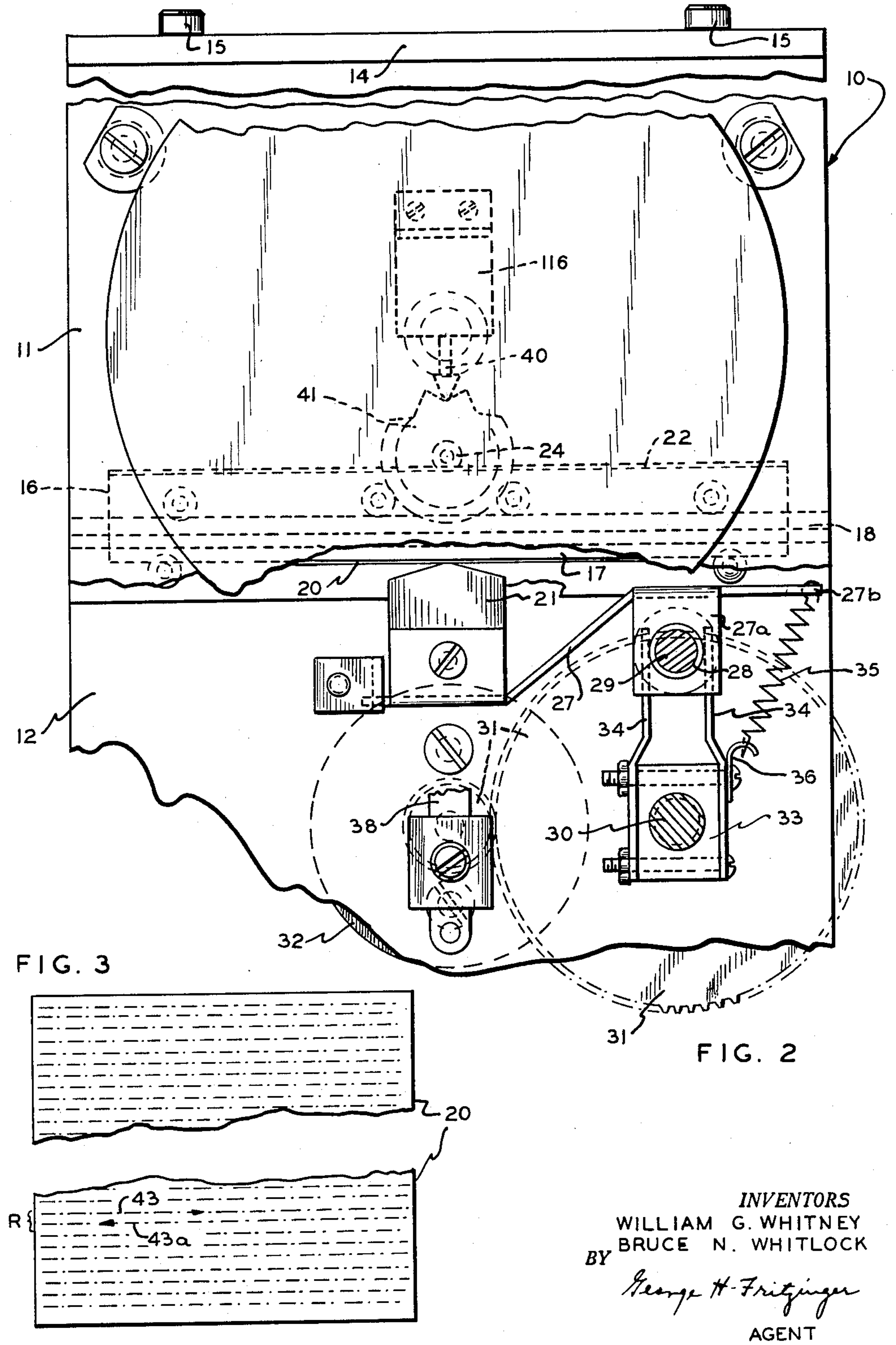
FIGURE 2 is a fractional side elevational view of this record-reproduce machine.
FIGURE 3 is a view of a magnetic record card for the present record-reproduce machine showing successive parallel tracks thereon by dash-dot lines.

The transversal recording and reproducing machine shown in FIGURES 1 and 2 has a rectangular frame 10 comprising two side plates 11 and 12 interconnected by end plates 13 and 14 through screws 15. About midway between the side plates is a rectangular card holder 16 comprising a plate 17 having turned over side flanges **17*a*. Bolted to the outer sides of these side flanges are guide brackets 18 having outwardly extending rails 18*a* which slidably engage respective grooves in the side frame plates to provide the card holder with a freedom for back and forth rectilinear movement. On the back side of the card holder plate 17 are angle irons 19 providing confronting tracks for receiving slidably the side edges of a card 20 and holding the card on the plate 17. The card 20 is a semi-flexible sheet as of suitable cardboard provided with a magnetizable coating on its outer side. Engaging this outer side is a magnetic head 21 movable crosswise of the machine for recording on and reproducing from the card along respective parallel tracks thereon, as later explained. The outer edges of the brackets 18 are provided with teeth forming racks 22 which are engaged by pinion gears 23 on a cross shaft 24. The shaft 24 is in turn coupled through gearing 25 to a reversible servo motor 26 which drives the card holder on the rails 18L** in either direction to any desired position under control of the selector system hereinafter described.

The magnetic head 21 is of the usual construction having a coil mounted on a magnetic core provided with pole pieces which are separated by a fine air gap. The tips of the pole pieces are engageable with the magnetic card 20 on a line about midway between the front and back edges of the side plates 11 and 12 (FIGURE 2). The head is mounted on one end of a carriage arm 27 having turned over apertured lugs **27*a* at its other end engaging a bearing 28. The bearing slides on a cross rod 29 supported at its ends by the side plates in parallel relation to the card holder. Parallel to the cross rod 29 is a feed screw 30 journaled at its ends in the side frame plates and coupled through gearing 31 to a reversible drive motor 32. Threaded on the feed screw is an elongated feed nut 33, and secured to opposite sides of this feed nut are extending arms 34 the tips of which are interposed between the side lugs 27*a* of the carriage arm 27 to couple the head carriage to the feed nut. A tension spring 35 is connected between a rearwardly extending finger 27b of the carriage arm 27 and a hook 36 on one of the transverse arms 34 to bias the carriage arm 27 about the support rod 29 and provide a suitable pressure of the head against the magnetic card. Thus, the head 21 can be driven in either direction by the motor 32** transversely of the magnetic card.

At the ends of travel of the head 21 there are end switches 37 and 38 respectively which stand normally in open positions. As the head reaches each end of its travel the carriage arm 27 moves against the respective end switch and closes the same to stop the drive motor 32 as will appear.

In order that the card holder 17 may be located precisely at definite intervals to place the head on track in each positioning of the card holder, a pawl 40 with a wedge-shaped tip is engageable with a toothed disk 41 secured on the shaft 24. By this engagement the shaft 24 is cammed into a definite position. The teeth of the disk 41 are so spaced that the engagement of the pawl with successive teeth will place successive tracks on the card holder in precise registration with the head.

The present invention resides particularly in a control system for the servo motor 26 by which the card holder can be shifted by remote control into any one of a multiplicity of succesisve positions placing successive ones of the parallel tracks on the card in precise registration with the magnetic head. The feature of the invention resides in recording and/or reproducing each character on two separate tracks respectively in opposite directions across the record so that each character can be reproduced by a single excursion of the head across the card starting from either end of the card. Thus, as shown in FIGURE 3, wherein the dotted lines represent respective tracks on the card there is for example a first track 43 in which a given character, say the letter R, is recorded from left to right and there is a next succeeding track 43*a* in which the same character is recorded from right to left. As will appear, the remote control system is adapted to bring a first track of the selected pair into registration with the head when the head is at one end of its travel and to bring the second track of the selected pair into registration with the head when the head is at the other end of its travel.

Figure 4:
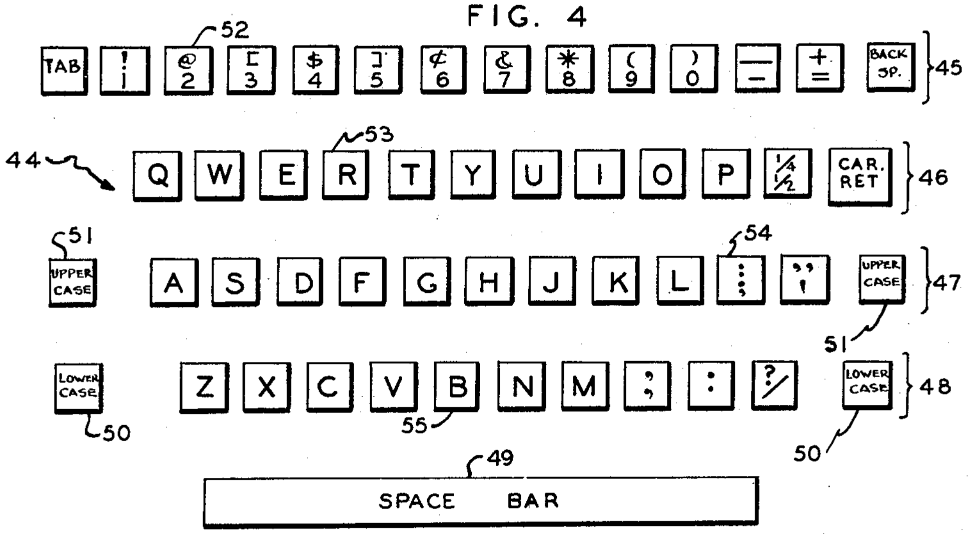
FIGURE 4 is a view of a typical keyboard of a typewriter mechanism for use in connection with the present record-reproduce machine.

The control system comprises a key lever switch for each character to be recorded and/or reproduced. The respective key lever switches are operated by a keyboard 44 shown in FIGURE 4. This keyboard comprises four rows or banks of keys designated 45 to 48 inclusive. The individual keys may represent letters, numbers, punctuation marks, etc. as shown. Ahead of the front or fourth row is a space bar 49 and at opposite ends of the third and fourth rows are lower-case and upper-case shift keys 50 and 51. Representative keys 52 to 55 inclusive from the respective rows are shown in FIGURE 6 to illustrate the operation of the entire keyboard.

The key lever switches may for example be operated by power driven cam units such as are used in the Flexowriter produced by Friden, Incorporated of San Leandro, California. As illustrated in FIGURE 5, when a key of the first or second rows is depressed, say key 53, it brings a cam unit $C_{53}$ into engagement with the back side of a power roll 56 driven by a motor not shown, and when a key of the third or fourth rows is pressed, say key 54, it brings a respective cam unit $C_{54}$ into engagement with the front side of the power roll. This is illustrated specifically with respect to key 54 in FIGURE 5. For example, when this key is depressed a key lever 57 is turned about pivot 58 to turn a release lever 59 counterclockwise about a pivot 60 on the front cam unit $C_{54}$ pivoted to the frame at 61. The release lever has two turned-over lips 59*a* and 59*b* positioned for engaging respective side lugs 62*a* and 62*b* on a two-lobe cam 62 journaled at 63 to the cam unit. The lip 59*a* engages the lug 62*a* to hold the cam in a normal position and is disengaged therefrom when the release lever is turned counterclockwise. As this disengagement occurs the lip 59*a* is moved into a position to engage the next oncoming lug 62*b* so long as the key 54 is held depressed. At the instant the lip 59*a* is disengaged from the cam the latter is shifted slightly counterclockwise by cantilever spring 64 bearing against one of two diametrically opposite side pins 65 on the cam. This initial shifting of the cam brings the adjacent one of the two serrated peripheral surfaces of the cam against the power roll whereupon the power roll drives the cam with an impulsive movement through about 180°. By this turning movement of the cam a high lobe thereof is propelled past the power roll to drive the hold cam unit $C_{54}$ counterclockwise about its pivot 61. This impulsive movement of the cam unit operates through suitable linkage to drive a type bar 66 against a platen 67. At the same time the cam unit is moved against a respective key lever switch designated by the number of the respective key with the suffix letter *s* to close this switch momentarily.

If the operator continues to hold the key 54 depressed the cam 62 is stopped short of a full one-half revolution of movement by the lug 62*b* striking the lip 59*b* of the release lever. However, when the key 54 is released the release lever is turned clockwise to disengage the lip 59*b* from the lug 62*b* and allow the cam to be moved ahead by the bias spring to normal position defined by engagement of the lip 59*a* with the lug 62*a*.

As shown in FIGURE 6, each key lever switch controls one or two character relays depending on whether the key has only one or two character designations thereon. For example, the key 54 has a semicolon designated thereon in lower case and a colon in upper case. When this key is depressed it causes either a relay 121 or a relay 124 to be activated depending on whether the machine is in lower case or upper case condition. The key 52 likewise has two designations and controls correspondingly relays 126 and 125. The keys 53 and 55 are single letter keys without distinction in the automatic pronunciation as to whether the operator types the small or capital letter, and control therefore respective single relays 127 and 128. The lower-case shift key 50 likewise controls a single relay 90 but the upper-case shift key 51 controls an upper-case audio relay 123 and controls through a diode at 122 an upper-case lock relay 103. All of the key lever switches are connected to a common lead 74 which in turn is connected through an on-off switch 75 to ground 76.

The selector control system comprises a Wheatstone bridge 77 connected across a pair of voltage supply terminals 78 typically of about 12.6 volts and 60 c.p.s. The bridge comprises one branch consisting of a potentiometer 79 having a slide contact 79*a* mechanically coupled to the servo motor 26 as indicated by the tie line 80. The second parallel branch of the bridge comprises a series of resistors including two fixed end resistors 81*a* and 81*b* typically of about 150 ohms each, two next succeeding fixed resistors 82*a* and 82*b* typically of about 50 ohms each which are shiftable alternately into and out of the bridge circuit depending on the positioning of the head as is later described, a single fixed resistor 83 also of about 50 ohms next to the resistor 82*b*, and then a series of intervening resistors 84 each of about 100 ohms of which there are as many as there are character selections to be made. From the junction points of the resistor series 84 are lead off wires to respective character relays. Firstly, as general description, when a character relay is operated it completes a diagonal arm of the bridge running from the respective junction point of the resistor series 84 via lead 85 to one input terminal of a servo amplifier 86 and from the other input terminal of this amplifier via lead 87 to the sliding contact 79*a* of the potentiometer 79. The output of the servo amplifier is connected by leads 88 to the control phase winding 26*a* of the servo motor. At the same time the diagonal arm of the bridge is completed the fixed phase winding 26*b* of the servo motor is connected to a 115 volt 60 c.p.s. source represented by the terminals 89. An unbalance in the bridge when the diagonal arm is completed starts the servo motor running to shift the card holder and concurrently to shift the sliding contact until the bridge is restored to a balanced condition. Each shift in connection of the diagonal arm from one junction to the next of the resistor series 84 reduces one leg in the left branch of the bridge by 100 ohms and increases the other leg of this branch by 100 ohms, and will unbalance the bridge to the extent that the servo motor will drive the card holder by two track intervals to restore the bridge to balance. On the other hand, the connection of one of the resistors 81a and 81b into the bridge circuit and the concurrent shorting of the other of the resistors increases one leg by 50 ohms and decreases the other leg by 50 ohms in the left branch of the bridge to unbalance the bridge only to the extent to cause the motor to shift the card holder by a single track interval to restore the bridge to balance. Thus, depending on which one of the resistors 81a and 81b is connected in the bridge circuit at the time a character selection is made, the card holder is driven to bring either the first or the second of the tracks of the respective character into registration with the magnetic head. The foregoing general description is illustrated next for the specific condition when lower-case key 50 is pressed. This key operation closes the key lever switch 50s and activates the character relay 90 from plus terminal 91. Operation of the relay 90 closes a switch 90a to provide ground connection for a control relay 92 via a lead 93, jumper 90e, switch 90a and ground 94 thereby causing the control relay 92 to be activated from a plus terminal 95 via a switch 96a of a latch relay 96, lead 97, switch 98a of a centralizer relay 98 and a lead 99. Also, operation of the character relay 90 closes a switch 90b to provide the relay with a hold circuit via lead 100, switch 92a of the control relay and ground 101 whereby to hold the character relay operated after the key lever switch 50s is opened until the control relay is later dropped out. Still further, operation of the character relay 90 closes a switch 90c to complete connection of a respective junction of the resistor series 84 to the amplifier input lead 85 and it opens a switch 90d to disconnect the plus terminal 102 from an uppercase lock relay 103 whereby to prevent activation of the uppercase relay so long as the lower-case relay is operated.

Operation of the control relay 92 not only closes the switch 92a to complete a hold circuit for the lower-case relay 90, but it closes a switch 92b to connect the fixed phase winding 26b of the servo motor 26 to the power source 89 whereby to start the motor running. Also, operation of the control relay opens a switch 92c to drop out a key unlock solenoid 104 whereby to lock the keyboard against any other operation of the keys until the selected character is pronounced as is taught by the Moore-Kobler application aforementioned. Still further, operation of the control relay opens a switch 92d to break connection of a plus terminal 105 through a null-relay 106 to ground and to place the null-relay under control of the Wheatstone bridge by reason of its connection across the output of the servo amplifier 86.

An unbalanced condition of the bridge when the diagonal arm is completed causes a voltage to be fed from the servo amplifier 86 to the variable phase winding 26a of the servo motor to cause the motor to start running in a direction to drive the slide contact 79a to rebalance the bridge and concurrently to move the card holder to place a lower-case track thereof into registration with the magnetic head. Also, the unbalance diagonal current from the servo amplifier is fed through a rectifier 107 to operate the null relay 106. This operation of the null relay opens contacts 106a to disconnect a plus terminal 107a from the centralizer relay 98 and cause this relay to remain unoperated. This unoperated condition of the centralizer relay causes the control relay to be held in at switch 98a upper contact and the control relay in turn causes the character relay 90 to be held in at switch 92a.

As the servo motor drives the contact 79a to restore the bridge circuit to a balanced condition the voltage across the null relay 106 falls and this relay drops out momentarily, closing the switch 106a and activating the centralizer relay 98. Operation of the centralizer relay shifts the switch 98a to its lower contact to drop out the control relay and provide a hold circuit for the centralizer relay from the plus terminal 95. The drop out of the control relay 92 in turn drops out the character relay 90 and reactivates the null relay 106 from the plus terminal 105 thereby disconnecting the plus terminal 107a from the centralizer relay and placing the latter under control of its hold circuit running from plus terminal 95. Also, operation of the centralizer relay opens a switch 98b to maintain the voltage source 108 disconnected from the key unlock solenoid 104 whereby to maintain this solenoid released and the keyboard locked for the time being after the control relay 92 is dropped out. Further, operation of the centralizer relay closes a switch 98c to complete connection of the drive motor 32 across an A.C. power source 109 through an on-off switch 110, lead 111, switch 98c lead 112, timer switch 113a of a timer 113, lead 114, switch 96b of the latch relay 96, and one or the other of the motor-direction control leads 115 of the drive motor 32 depending on the setting of the latch relay 96. The closing of the switch 98c also provides power to a terminal 113b of the timer 113 to operate a drive clutch (not shown) in the timer and cause the timer switch 113a to be initially held open to delay start of the drive motor until elapse of a preset period determined by the setting of the timer knob 113c in accordance with the teaching of the Moore-Kobler application aforementioned. On the other hand, if the timer knob is at zero setting, the switch 113a is initially closed so that there is no delay in the start of the drive motor. Operation of the centralizer relay 98 also closes a switch 98d to activate a solenoid 116 to drive the centralizer pawl 40 into engagement with the toothed disk 41 and effect a precise registration of the selected track with the magnetic head.

The latch relay 96 is held in one or the other of its latched positions depending on whether the magnetic head is in one or the other of its end positions. For instance, if the head is at its left end position as indicated in FIGURE 6 the end switch 37 is held closed to activate the left winding of the relay 96 from plus terminal 117 to ground 118 causing the relay to be latched in its left hand position by a mechanical latching means 119 diagrammatically illustrated. A switch 96c of the latch relay is then closed to short the resistor 82b of the Wheatstone bridge and a switch 96d of this latch relay is open to leave the resistor 82a in circuit. This unbalances the bridge by a one track interval on the record causing the servo motor to drive the card holder to bring the magnetic head into registration with a first one of the pair of tracks assigned to a "lower-case" pronunciation. Also, the switch 96b is now in position to connect that one of the power leads 115 to the drive motor to cause the motor to drive ahead to the right.

To summarize the conditions existing during the drive of the magnetic head across the record card, the character relay which was operated to initiate the operation of the machine is dropped out, the control relay 92 is dropped out, the null relay 106 is operated from the plus terminal 105, the centralizer relay 98 is operated from the plus terminal 95 and the key unlock solenoid 104 is dropped out causing the keyboard to be locked.

As the magnetic head 21 nears the right end of the record 20 it closes the end switch 38 to provide operating current to the right coil of the latch relay 96 from a plus terminal 120 to ground 118, thereby throwing the latch relay to the right. The throw of switch 96a from its left to right contacts momentarily opens the hold circuit for the centralizer relay 98 and drops out this relay. This causes switch 98a to close with its upper contact to make power available again to the control relay 92 from the plus terminal 95 when ground connection is again restored to this relay. Also, the return of the centraliizer relay to unoperated position opens the switch 98b to drop out the unlock solenoid 104 and allow the keyboard to be again operated. Further, the drop out of the centralizer relay opens the switch 98c to stop the drive motor and it opens the switch 98*d* to disengage the centralizing pawl 40. The machine now stands in its initial condition which it had before the lower case key 50 was operated—i.e., (1) no character relay is now operated, (2) the control relay 92 is not operated, (3) the null relay 106 is operated, (4) the centralizer relay is not operated and (5) both motors are at standstill. However, the latch relay 96 is now shifted to its right position.

Upon the operator pressing any key after having last pressed the lower case key of the two shift keys the lower-case character of the depressed key will be pronounced. For instance, say the operator next presses key 54 having a "semi-colon" in lower case, this closes the key lever switch 54*s* and activates the respective lower-case relay 121 from the plus terminal 91 through switch 103*a* right contact of the now unoperated upper case lock relay 103. Operation of the lower case relay 121 closes the switch 121*a* to activate the control relay and it closes switch 121*b* to provide then a hold circuit for the relay 121 through switch 92*a* of the control relay, the same as when the lower case relay 90 was operated. Further, operation of the relay 121 closes a switch 121*c* to connect a respective junction of the resistor series 84 to the diagonal arm of the bridge. This starts the servo motor 26 in a direction to balance the bridge and bring the respective track bearing the pronounciation "semi-colon" in registration with the head at the second track of the respective pair because of the magnetic head 21 being now at the right end of its travel. When the bridge reaches a near balance condition the null-relay 106 is dropped out momentarily to operate the centralizer relay which in turn drops out the control relay and it in turn drops out the character relay. Further, operation of the centralizer relay starts the drive motor now in a direction to drive the head from right to left because of the latch relay being in its rightward position. The operation of the control relay restores operation of the null-relay 106 from the plus terminal 105, but the centralizer relay remains operated by its hold circuit. However, when the drive motor has moved the magnetic head 21 to its left end position the end switch 37 is closed to shift the latch relay to the left position, which in turn drops out the centralizer relay, stops the drive motor, restores the keyboard to an unlocked condition and disengages the centralizer pawl 40 to permit the card holder to be shifted to a next selected position.

If the upper-case key 51 were next pressed the closure of the key lever switch 51*s* would activate the upper-case lock relay 103 from the plus terminal 102 through switch 90*d* of lower-case relay 90 and diode 122. Operation of the upper-case lock relay 103 closes switch 103*b* to provide a hold circuit for this relay from the plus terminal 102. Also, it throws switch 103*a* to its left contact to disconnect the lower case relays of the character keys and to connect the upper case relays of the character keys to the plus terminal 91 whereby to prepare the upper case relays for operation when these relays are provided selectively with ground connection. Also, the operation of switch 103*a* to its left contact activates the audio upper case relay 123 from the plus terminal 91 through the key lever switch 51*s*. Operation of the relay 123 causes the machine to select the track bearing the recordation "upper case" and to scan that track to pronounce the phrase "upper case," the same as when the character relay 90 was activated to cause the machine to pronounce the phrase "lower case." For instance, this sequence of operations is started by switch 123*a* being closed to activate the control relay, switch 123*b* being closed to provide a hold circuit for the upper case audio relay 123 through switch 92*a* of the control relay, and switch 123*c* being closed to connect the diagonal arm of the Wheatstone bridge to a respective junction point of the resistance series 84 whereby the correct track selection is made and the machine then started to scan that track.

If the operator presses the key 54 after having last pressed the upper case key 51 the respective lower case relay 121 will not now be operated because the upper case lock relay 103 is operated and holding switch 103*a* at its left contact. Instead, the closure of the key lever switch 54*s* will cause the upper case relay 124 to be operated from the plus terminal 91 through the switch 103*a* left contact. Operation of the character relay 124 will close a switch 124*a* to activate the control relay 92, will close switch 124*b* to provide a hold circuit for the relay 124 through switch 92*a* of the control relay and will close switch 124*c* to connect the diagonal arm of the bridge to a respective junction point of the resistor series 84 whereby to start the servo motor running to bring a respective track bearing the recordation of the term "colon" in registration with the magnetic head and then start the drive motor to close the machine to pronounce the term "colon" in the same manner as the machine is operated to pronounce the previous characters hereinbefore explained. If any other character keys such as the key 52 is next pressed a respective upper case relay 125 would be operated from the plus terminal 91 through the switch 103*a* left contact of the upper case lock relay 103 to cause the machine to select the respective track bearing the recordation of the number "2." However, if the operator next presses the lower case key 50 the lower case relay 90 would be operated directly from the plus terminal 91 to open the switch 90*d* and drop out the upper case lock relay 103 which in turn would restore the switch 103*a* to its right contact to prepare the circuits only of the lower case relays for a next subsequent operation. For instance, if after having so pressed the lower case key 50 the operator presses the key 52 the respective lower case relay 126 would be operated from the plus terminal 91 through the switch 103*a* right contact. Operation of the lower case relay 126 will close switch 126*a* to activate the control relay 92, will close switch 126*b* to provide a hold circuit for the lower case relay 126, and will close switch 126*c* to connect a respective junction point of the resistor series 84 to the diagonal arm of the bridge and start the servo motor running to select the respective track on the magnetic card bearing the recordation of the "@" designation.

If the operator presses the key 53 bearing the designation of the letter "R" the respective relay 127 is operated directly from the plus terminal 91, the same as the lower case relay 90 is operated when the key 50 is pressed. Closure of the switch 127*a* activates the control relay of switch 127*b* provides a hold circuit for the relay 127, and of switch 127*c* connects a respective junction point of the resistor series 84 to the diagonal arm of the bridge causing the machine to select the respective track and pronounce the letter "R." Since the relay 127 is connected directly to the plus terminal 91 it is operated the same whether the machine is in upper case or lower case condition—which is permissible when no distinction is made in the pronunciation of the letter "R" whether the machine is in upper or lower case condition. Similarly, upon the operator pressing the key 55 the respective lower case relay 128 is operated directly from the plus terminal 91 to cause the control relay 92 to be operated through switch 128*a*, the relay 128 to be held in through switch 128*b*, and a respective junction of the resistor series 84 to be connected to the diagonal arm of the bridge through the switch 128*c* whereby the machine will select the respective track bearing the recordation of the letter "B" and then scan that track to pronounce that letter in the same manner whether the machine is in lower or upper case condition. However, depending on whether the magnetic head 21 is at its left end or right end of travel when a key is depressed the machine will select either the first or the second of the pair of tracks assigned to the respective character.

The detailed description of the present invention in connection with a specific embodiment thereof is intended to be illustrative and not necessarily limitative thereof, since the embodiment of the invention herein particularly shown and described is subject to changes and modifications without departure from the scope thereof, which we endeavor to express according to the following claims.

We claim:

1. In a machine for recording and/or reproducing selected characters or other information: the combination of a typewriter keyboard having depressible keys with respective characters designated thereon, a recording and reproducing machine including a record medium having tracks bearing recordings pertaining to said characters respectively, a record-reproduce head, and reversible means for driving said head in either direction crosswise of said record medium, reversible means for shifting said record medium and head relative to each other in either direction transverse to that of the head movement, and control means for said shifting means including direction sensing means responsive to depression of each selected key of said keyboard and to the prior relative position of said head and record medium when the selected key is depressed for causing the head and record medium to be moved into a predetermined position wherein the head registers with a track on the record medium preselected for the character designated on said key.

2. The combination set forth in claim 1 including means for starting said driving means when the head is brought into registration with a preselected track, means operable by said head for stopping the drive means upon completion of each traversal of the record medium and for concurrently preparing the drive means for driving the head in a reverse direction, wherein said record medium includes two side-by-side tracks for each character to be recorded on and reproduced from the record medium, including means in said control means for causing said head to register with a first one of the tracks of the respective pair when a key is depressed while the head is at one end of its travel and for causing the head to register with a second one of the tracks of the respective pair when a key is depressed while the head is at the other end of its travel.

3. In a machine for recording and reproducing selected characters or other information: the combination of a typewriter keyboard having characters designated on the respective keys thereof, a transversal recording and reproducing machine including a card having a magnetic coating on one side thereof, a magnetic head engageable with said coated side of said card and mounted for movement in either direction crosswise of the card, a card holder mounted for movement in either direction at right angles to said head movement, reversible drive means for said head, reversible shifting means for said card holder, said card having parallel transverse tracks for the respective characters selectable by said keyboard, means directionally responsive to each selected depression of said keyboard according to the direction of the selected track from the track engaged by said head when the selected key is depressed for operating said shifting means to bring a respective track into registration with said head and thereupon to start said drive means to move said head along the selected track, and means to stop said drive means after each traversal of said card by said head.

4. The combination set forth in claim 3 wherein said card has a pair of side-by-side tracks for each character, including means responsive according to which end of travel the head is in when a key of the keyboard is depressed for controlling said shifting means to bring a first one of the pair of tracks into registration with the head when the head is at one end of travel and to bring the other one of the pair of tracks into registration with the head when the head is at the other end of its travel whereby each character is recordable on and reproducible from the card by movement of the head from either end of the card to the other.

5. In a machine for reproducing selected characters or other information, comprising a record medium having a series of parallel tracks successive pairs of which have recordations of respective characters of which one recordation is in one direction along one track of the pair and the second recordation is in the opposite direction along the other track of the respective pair, a reproduce head cooperable with said record medium, drive means for producing a relative back and forth traveling movement between said head and record medium in directions along said tracks, means for stopping said drive means after each traversal of said record medium by said head, and shifting means selectively operable for producing a relative shifting movement between said head and said record medium in directions at right angles to the driven movement of said head to bring a track bearing a recordation of a selected character in registration with said head including means controlled according to which end position the head occupies when said shifting means is operated for bringing into registration with the head a predetermined one of the respective pair of tracks when the head is at one end position and to bring the second one of the respective pair of tracks into registration with the head when the head is at its other end position.

6. In combination: a record medium having a multiplicity of parallel tracks, a keyboard having a multiplicity of keys with character designations thereon, a Wheatstone bridge having one branch comprising a multiplicity of resistors serially connected and a parallel branch comprising a potentiometer, a record-reproduce head movable across said record medium along the respective tracks thereon, a reversible drive motor for relatively moving said head and record medium along said tracks, a servo motor for providing a relative shifting movement between said head and record medium in directions at right angles to said tracks and for concurrently shifting the slide contact of said potentiometer, a diagonal arm in said bridge connectable selectively between junction points of said resistance series and the slide contact of said potentiometer for feeding an unbalance current of the bridge to said servo motor to bring a selected track of said record medium into registration with said head and concurrently to rebalance the bridge, the resistances of said resistance series each having a predetermined value to cause a shift of two track intervals relative to said head for each shift of said diagonal arm from one junction of said resistance series to the next, and means selectively operable by the keys of said keyboard for connecting said diagonal arm to respective junction points of said resistance series including means to start said drive motor after a selected track is brought into registration with said head.

7. The combination set forth in claim 6 including means operable as said head is moved into each end position of travel for stopping said drive motor and concurrently preparing the circuit of the drive motor for subsequent operation of the motor in a reverse direction.

8. The combination set forth in claim 6 including means operable as said head is moved into one end position of travel for changing the balance of said bridge by one track interval in one direction and operable as said head is moved into the other end position of travel for changing the balance of said bridge by one track interval in the reverse direction.

9. In a machine for recording and reproducing respective bits of information on respective parallel tracks of a record medium: the combination of a head movable across said record medium along selective tracks thereof, a reversible drive motor for moving said head in either direction along said tracks, means for shifting said record medium in directions at right angles to said head movement, and remote control means selectively operable to activate said shifting means to bring one of a selected pair of tracks into registration with said head including means controlled by said remote control means according to whether the head is at one end position or the other when the remote control means is operated for selecting between the tracks of said pair and for thereupon starting said drive means to drive said head in a direction to scan the selected track.

References Cited in the file of this patent

UNITED STATES PATENTS

| | | |
|---|---|---|
| 2,604,549 | Begun | July 22, 1952 |
| 2,771,509 | Dudley et al. | Nov. 20, 1956 |
| 2,901,738 | Willard | Aug. 25, 1959 |
| 2,986,725 | Dirks | May 30, 1961 |